United States Patent
Vittoz

[11] 3,809,929
[45] May 7, 1974

[54] TEMPERATURE SENSING DEVICE

[75] Inventor: Eric André Vittoz, Cernier, Switzerland

[73] Assignee: Centre Electronique Horloger SA, Brequet, Neuchatel, Switzerland

[22] Filed: June 19, 1972

[21] Appl. No.: 264,339

[30] Foreign Application Priority Data
June 21, 1971   Switzerland.......................... 9065/71

[52] U.S. Cl. ............................ 307/310, 73/362 SC
[51] Int. Cl. ....................... H03k 3/295, G01k 7/00
[58] Field of Search...... 73/362 SC, 362 R, 362 CP; 307/310

[56] References Cited
UNITED STATES PATENTS

| | | | |
|---|---|---|---|
| 3,139,753 | 7/1964 | Brudner | 73/362 AR |
| 3,106,645 | 10/1963 | Kaufman | 307/310 |
| 3,469,449 | 9/1969 | Keller | 73/362 A R |
| 3,430,077 | 2/1969 | Bargen | 307/310 |
| 3,440,883 | 4/1969 | Lightner | 73/362 SC |
| 3,383,920 | 5/1968 | Greenly | 73/362 SC |
| 3,102,425 | 9/1963 | Westman et al. | 73/362 SC |
| 3,266,316 | 8/1966 | Jones et al. | 73/362 CP |
| 3,617,778 | 11/1971 | Korom | 307/310 X |

*Primary Examiner*—Richard C. Queisser
*Assistant Examiner*—Frederick Shoon
*Attorney, Agent, or Firm*—Stevens, Davis, Miller & Mosher

[57] ABSTRACT

A digital output temperature sensing device comprises identical first and second n-p-n transistors manufactured together in an integrated circuit and across which different base-emitter voltages are applied. The non-saturated collector-emitter current of the second transistor, which is a function of the collector-emitter current through the first transistor and of the absolute temperature, is "compared" with a temperature-independent current provided as a function of the collector-emitter current of the first transistor and of the ratio of the effective injection surface areas of the base-emitter junctions of a pair of otherwise identical p-n-p transistors, a temperature dependent digital output signal being provided according to whichever of the "compared" currents is greater.

5 Claims, 4 Drawing Figures

TEMPERATURE SENSING DEVICE

The invention relates to digital output temperature sensing devices, in particular of a type which can be provided in the form of an integrated circuit.

Many temperature sensing devices are known. Most types cannot, however, be provided in the form of an integrated circuit whilst those which can be provided in an integrated circuit operate by a comparison of the voltage at the terminals of a conducting junction (which is a function of the temperature) with a reference voltage which is as stable as possible; see IEEE Journal of Solid-State Circuits, Vol. SC 1. No 1, Sept. 1966, pages 8–13. Moreover, these known devices do not supply data concerning the temperature in a logic form (all-or-none) compatible with subsequent logic treatment of this data.

An object of the invention is to remove these drawbacks and therefore to provide a temperature sensing device compatible with integrated techniques which supplies all-or-none output signals ready to be treated in logic systems, for example including MOS transistors, and which does not necessitate a very stable reference.

The invention therefore provides a digital output temperature sensing device comprising at least one pair of transistors forming part of the same integrated circuit and whose base-emitter voltages are different, an output value being given by the ratio of the collector currents of these transistors.

Several embodiments of sensing devices according to the invention will now be described, by way of example, with reference to the accompanying drawings, in which.

Figure 1:
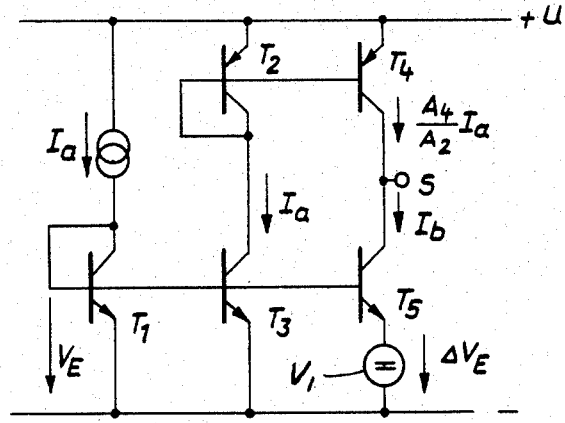
FIG. 1 is the basic circuit diagram of a first embodiment.

The device shown in FIG. 1 comprises five two-pole transistors $T_1$ to $T_5$ connected to the positive terminal +U and the negative (or "0") terminal of a voltage source. Transistors $T_1$, $T_3$ and $T_5$ are n-p-n type, and transistors $T_2$ and $T_4$ are p-n-p type. The transistors of the same types all have substantially the same characteristics. Transistor $T_1$ is supplied by a source of current $I_a$ which may, for example, simply be a resistor connected to terminal +U. The base of transistor $T_1$ is connected to its collector as well as to the bases of transistors $T_3$ and $T_5$. The emitters of transistors $T_1$ and $T_3$ are connected to the negative terminal of the voltage source. The collector of transistor $T_3$ is connected to the base and to the collector of transistor $T_2$ as well as to the base of transistor $T_4$. The emitters of transistors $T_2$ and $T_4$ are connected to the +U terminal of the voltage source. The emitter of transistor $T_5$ is connected to the negative terminal of the voltage source via an auxiliary source $V_1$ of voltage $\Delta V_E$. Finally, the collectors of transistors $T_4$ and $T_5$ are connected together at an output terminal S.

Operation of the described circuit is as follows: The current $I_a$ is divided between the collector of transistor $T_1$ and the bases of transistors $T_1$, $T_3$ and $T_5$. If these three transistors have a high gain, their base current may be neglected. $I_a$ thus determines the collector current of transistor $T_1$. The close similarity of the characteristics of transistors $T_1$ and $T_3$ in turn makes the collector current of transistor $T_3$ equal to $I_a$, and the same current $I_a$ is made to pass through the collector of transistor $T_2$. Transistor $T_4$ has a geometry different to that of transistor $T_2$ in as much as the effective injection surface area $A_4$ of its base-emitter junction is smaller than the effective injection surface area $A_2$ of transistor $T_2$. If the base currents of transistors $T_2$ and $T_4$ are negligible, the non-saturated collector current of transistor $T_4$ is given by:

$$I_a \cdot A_4/A_2.$$

Transistors $T_3$ and $T_5$ are identical but the base-emitter voltage of $T_5$ is reduced by an amount $\Delta V_E$ in relation to the base-emitter voltage of transistor $T_3$. Consequently, the non-saturated current $I_b$ of transistor $T_5$ obeys the relationship $I_b < I_a$. The basic principle of the invention resides on the fact that the ratio non-saturated $I_b/I_a$ is a function of the temperature whereas the current $I_a \cdot A_4/A_2$ is independent of the temperature. The current which effectively flows between transistors $T_4$ and $T_5$ will be the smaller of the two currents $I_b$ or $I_a A_4/A_2$. The output voltage willl be close to +U if $I_b < (I_a A_4/A_2)$ (transistor $T_4$ saturated) and will be close to 0 if $I_b > (I_a A_4/A_2)$ (transistor $T_5$ saturated).

The transistion between one state and the other will take place when the currents $I_b$ and $I_a \cdot A_4/A_2$ are equal, which corresponds to a well defined temperature.

The theory of this device is as follows:

The relation between the base-emitter voltage $V_E$ of a transistor, its collector current $I_c$, and the absolute temperature T is the following (see IEEE Journal of Solid-State Circuits, Vol SC2 No 2, June 1967, page 57):

$$I_c = \alpha T^2 \exp\left[(q/kT)(V_E - V_{G0})\right] \quad (1)$$

where $\alpha$ is a constant depending upon the method of manufacture of the transistor and proportional to the effective injection surface area A of its base-emitter junction;

n is a constant (about 1.5) depending upon the method of manufacture;

q is the electronic charge ($1.602 \times 10^{-19}$ Coulomb);

k is Boltzmann's constant ($1.38 \times 10^{-23}$ J/° K); and $V_{G0}$ is the voltage corresponding to the forbidden band width of the semi-conductor material extrapolated to 0° K. This voltage is 1.205 V for silicon.

Transistors $T_1$ and $T_5$ of FIG. 1 are identical, i.e., simultaneously manufactured in the same integrated circuit and having the same dimensions, and thus obey the same equation (1). The base-emitter voltage of transistor $T_5$ is however reduced by $\Delta V_E$ (several tenths or hundreths of a millivolt). If we assume that the base currents of transistors $T_1$, $T_3$ and $T_5$ are negligible compared to $I_a$, relation (1) gives $$I_b/I_a = \exp\left[-\Delta V_E (q/kT)\right] \quad (2)$$

as long as transistor $T_5$ is not saturated.

The ratio $I_b/I_a$ is thus a definite function of the temperature and increases with the temperature. The greater the value of $\Delta V_E$, the smaller is the ratio but the more rapidly it changes.

If transistor $T_3$ is also identical to transistor $T_1$, its collector current is equal to $I_a$.

The transistors $T_2$ and $T_4$ are strictly identical with one another, except for their effective base-emitter injection surface areas $A_2$ and $A_4$ respectively. If the base currents of transistors $T_2$ and $T_4$ are negligible, the non-saturated collector current of transistor $T_4$ is thus $I_a(A_4/A_2)$.

If the ratio $A_4/A_2$ is such that:

$$A_4/A_2 = \exp\left[-\Delta V_E \, (q/kT_0)\right] \tag{3}$$

the collector currents of transistors $T_4$ and $T_5$ balance exactly at the temperature $T = T_0$.

If $T > T_0$, the collector current of transistor $T_5$ is greater than that of $T_4$; transistor $T_5$ saturates and the potential at output S drops to about zero (logic state 0).

If $T < T_0$, the collector current of transistor $T_4$ is greater than that of $T_5$; transistor $T_4$ saturates and the potential at output S rises to about +U (logic state 1).

Figure 2:
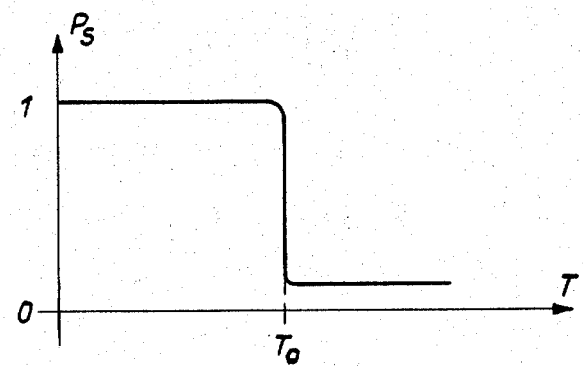
FIG. 2 is an explanatory diagram showing the output signal of the FIG. 1 circuit as a function of the temperature.

The voltage $U_s$ at output terminal S of the circuit thus changes state when the temperature passes a given value $T_0$, as shown in FIG. 2 which represents $U_s$ as a function of the temperature.

The voltage shift $\Delta V_E$ may be provided in various different manners, either:

a. By providing a resistor R between the emitter of transistor $T_5$ and the negative terminal of the voltage source. We thus obtain $\Delta V_E = RI_b$ and equation (2) becomes $$I_b/I_a = \exp\left[-RI_b \, (q/kT)\right]$$

or $$T = [Rq/(k \ln I_a/I_b)] \, I_b \tag{4}$$

This relation shows that as soon as $\ln I_a/I_b \gg 1$, the relative variations of $I_b$ are about the same as those of temperature T. It is no longer the ratio $I_b/I_a$ which is a given function of the temperature, but the current $I_b$ itself. Any relative error in $I_a$ will correspond to an equal relative error in the temperature. For example, a 10 percent error in $I_a$ would give a 10 percent error in the Absolute Temperature T, i.e., about 30° K = 30° C at ambient temperature. A precise current $I_a$ is therefore required.

b. Voltage shift $\Delta V_E$ may also be provided from a reference voltage, for example from the supply voltage +U by means of a resistive voltage divider.

Equation (2) may thus be directly applied. This equation shows that a relative variation of U, which will lead to a corresponding relative variation of $\Delta V_E$, corresponds to an equal relative error in the temperature. Thus, a 10 percent variation of U would give a 10 percent variation of $\Delta V_E$ corresponding to a 10 percent relative error in T, i.e., about 30° C at ambient temperature.

This solution is only applicable if a sufficiently precise reference voltage is available.

c. Shift $\Delta V_E$ may also be obtained from the voltage at the terminals of a conducting junction. An interesting embodiment of such a circuit is shown in FIG. 3.

Figure 3:
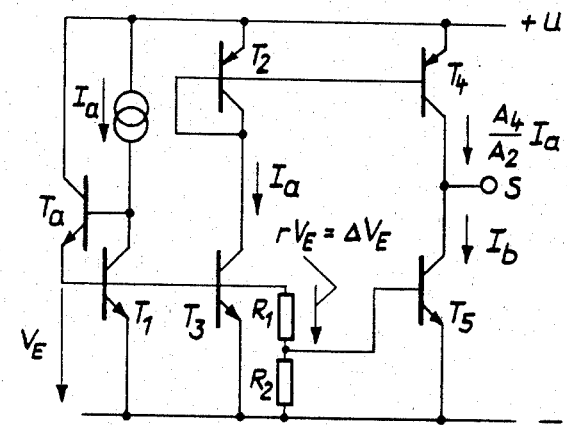
FIG. 3 is a circuit diagram of a second embodiment.

The circuit of FIG. 3 is the same as that of FIG. 1, except that a voltage divider $R_1 R_2$ is connected between the bases of transistors $T_3$ and $T_5$ and the negative terminal, and a current amplifying transistor $T_a$ is provided with its collector connected to the voltage terminal +U, and its base and emitter respectively connected to the collector and base of transistor $T_1$.

In the FIG. 3 circuit, the voltage shift $\Delta V_E$ is a fraction $r$ of the base-emitter voltage $V_E$ of transistors $T_1$ and $T_3$. This fraction $r$ is determined by the ratio of the values of resistors $R_1$ and $R_2$, these values being selected to be sufficiently low so that the voltage drop due to the base current of transistor $T_5$ is negligible. The current amplifying transistor $T_a$ is thus provided to supply the relatively high current passing through the divider $R_1 R_2$ without reducing the collector current of transistor $T_1$.

Since $\Delta V_E = rV_E$, equation (2) can be rewritten $$I_b/I_a = \exp\left[-rV_E \, (q/kT)\right] \tag{5}$$

$V_E$ may be taken from equation (1), since the collector current of transistor $T_1$ is practically equal to 1:

$$V_E = V_{G0} + (kT/q) \ln (I_a/\alpha T^n) \tag{6}$$

thus $$I_b/I_a = \alpha^r \, I_a^{-r} \, T^{nr} \exp\left[-rV_{G0q}/kT\right] \tag{7}$$

The ratio $I_b/I_a$ is thus a definite and rapid, substantially exponential, function of the temperature T. It also depends on $I_a$, but slowly since $r$ is less than 1.

These dependencies can be mathematically expressed by calculating the relative variations of $x = I_b/I_a$ in relation to those of T and $I_a$. We thus obtain:

$$dx/x/dT/T = r\left[n + (V_{G0q}/kT)\right] \tag{8}$$

$$dx/x/dI_a/I_a = -r \tag{9}$$

In the range of ambient temperature, the term $n + (V_{G0q}/kT)$ has a value of about 50.

The ratio $I_b/I_a$ is thus about 50 times less sensitive to relative variations of $I_a$ than to relative variations of T.

An error of 10 percent in $I_a$ thus corresponds to an error of only 0.2 percent in T, about 0.6° C at ambient temperature.

The ratio $I_b/I_a$ also depends to a high degree upon the ratio $r$ of the resistances. However, it is well known to the person skilled in the art to provide very precise and very stable resistance ratios using integrated circuits.

The device described above and the variations thereof form an electronic thermostat whose output changes state when the temperature passes by a given value $T_0$.

Figure 4:
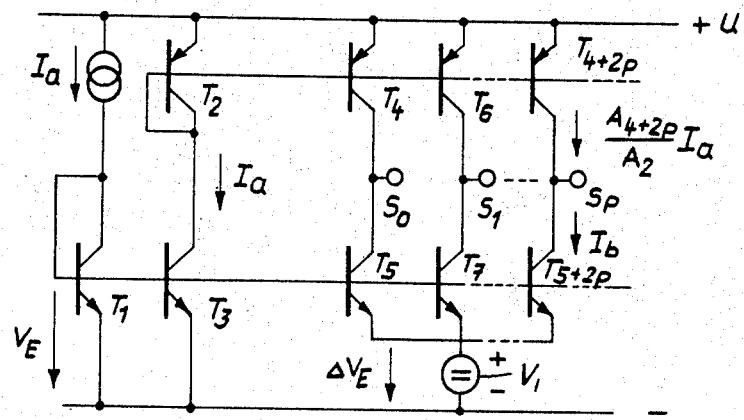
FIG. 4 is a circuit diagram of a third embodiment in the form of a digital output thermometer.

The embodiments of FIGS. 1 and 3 can be developed into a thermometer with a logic (all-or-none) output. For this purpose, the circuit is extended by adding other p-n-p and n-p-n transistors whose base-emitter junctions are in parallel with those of transistors $T_4$ and $T_5$ respectively and whose collectors are connected in complementary pairs. Such a circuit developed from FIG. 1 with p pairs of added transistors $T_6$, $T_7$ ... $T_{4+2p}$, $T_{5+2p}$ is shown in FIG. 4. The p-n-p transistors $T_4$ ... $T_{4+2p}$ are all identical, except that they each have a different selected effective surface area of their base-emitter junctions. The n-p-n transistors $T_1$ ... $T_{5+2p}$ are all identical.

The switching temperature $T_p$ of ouptut terminal $S_p$ is given by the following relation, taken from generalised equation (3):

$$T_p = V_{Eq}/k \; ln \; A_2/A_{4+2p}$$

(10)

where $A_{4+2p}$ is the effective injection surface area of the emitter-base junction of transistor $T_{4+2p}$.

The various methods of providing $\Delta V_E$ remain applicable in this circuit with several levels. In particular it is possible to use the means employed in the preferred embodiment of FIG. 3, in which case the voltage divider $R_1 \; R_2$ would be common to all of the transistors $T_5$, $T_7$ ..., $T_{5+2p}$.

It can be seen that by suitable selection of the effective injection surface areas $A_2$ to $A_{4+2p}$, the output terminals $S_o$ to $S_p$ will each correspond to switching from one state to the other at a defined temperature, the states shown at terminals $S_o$ to $S_p$ thus defining a form of temperature graduation.

What is claimed is:

1. Digital output temperature sensing device, comprising identical first and second transistors in an integrated circuit, said transistors each including a base, an emitter and a collector, means for applying different base-emitter voltages across the first and second transistors for passing a first collector-emitter current through the first transistor and a second collector-emitter current through the second transistor, the second current being a function of the first current and of the absolute temperature, means for supplying a third current as a function of the first current independent of the absolute temperature, the second and third currents being equal at a given absolute temperature, said means for supplying said third current including a pair of transistors of opposed type to the first and second transistors, said pair of transistors having base-emitter junctions with different effective injection surface areas and otherwise being identical with one another, and means for supplying a digital output signal according to whichever of the second and third currents is greater.

2. Device according to claim 1, in which said difference of the base-emitter voltages is provided by a resistor in series with the emitter of one of said first and second transistors.

3. Device according to claim 1, in which said difference of the base-emitter voltages is provided from a reference voltage.

4. Device according to claim 1, in which the means for providing said difference of the base-emitter voltages is a resistive voltage divider.

5. Device according to claim 1, in which the comparison of the currents is carried out by at least one pair of complementary p-n-p/n-p-n transistors, the collector currents of each pair competing with one another and being equal at a given temperature.

* * * * *